May 9, 1950 C. F. FFOLLIOTT 2,506,715

LOUD-SPEAKING TELEPHONE STATION SET WITH SEPARATE ACOUSTIC PASSAGES TO THE RECEIVER AND TRANSMITTER

Filed Aug. 22, 1947

INVENTOR.
Charles F. Ffolliott

BY
Smith, Olsen & Baird

Attorneys

Patented May 9, 1950 | 2,506,715

UNITED STATES PATENT OFFICE 2,506,715

LOUD-SPEAKING TELEPHONE STATION SET WITH SEPARATE ACOUSTIC PASSAGES TO THE RECEIVER AND TRANSMITTER

Charles F. Ffolliott, Elgin, Ill., assignor to Automatic Electric Laboratories, Inc., Chicago, Ill., a corporation of Delaware Application August 22, 1947, Serial No. 770,137

6 Claims. (Cl. 179—81)

The present invention relates to loud speaking telephone station apparatus, and more particularly to such apparatus incorporating an improved acoustic filter and dial mounting arrangement.

In a loud speaking telephone system, station apparatus is provided that comprises a housing for a microphone and a loud speaker and a support for an impulse transmitting mechanism of the dial type. Associated with and connected to the station apparatus is auxiliary apparatus comprising a ringer, an amplifier unit, a hybrid coil, a balancing network, one or more relays, and a telephone line terminal; which telephone line terminal is associated with automatic switching apparatus so that a telephone connection may be set up by the switching apparatus from a calling station to a called station. In an established connection involving two stations singing of the amplifier units occurs occasionally as the result of acoustic coupling at each station between the associated microphone and loud speaker.

It has been found that the acoustic coupling that is primarily responsible for singing is of sound waves in the higher frequencies above approximately 2000 cycles per second. While damping elements have been employed theretofore to limit coupling between the microphone and the associated loud speaker at a telephone station, such elements have not been frequency selective.

Accordingly it is an object of the present invention to provide in telephone station apparatus including a microphone and a loud speaker, an improved arrangement for limiting acoustic coupling therebetween that is frequency selective.

Another object of the invention is to provide in telephone station apparatus of the character noted, an acoustic wave filter for limiting coupling between the microphone and the loud speaker.

Another object of the invention is to provide in telephone station apparatus including a housing for a microphone and a loud speaker and supporting an impulse transmitting mechanism of the dial type, an improved unitary mounting arrangement for the impulse transmitting mechanism and for the microphone.

A further object of the invention is to provide in telephone station apparatus including a housing for a microphone and a loud speaker and supporting an impulse transmitting mechanism, an improved composite mounting for the impulse transmitting mechanism and for the microphone and acoustic wave filter for limiting acoustic coupling between the microphone and the loud speaker.

Further features of the invention pertain to the particular arrangement of the elements of the telephone station apparatus, whereby the above outlined and additional operating features thereof are attained.

Figure 1:
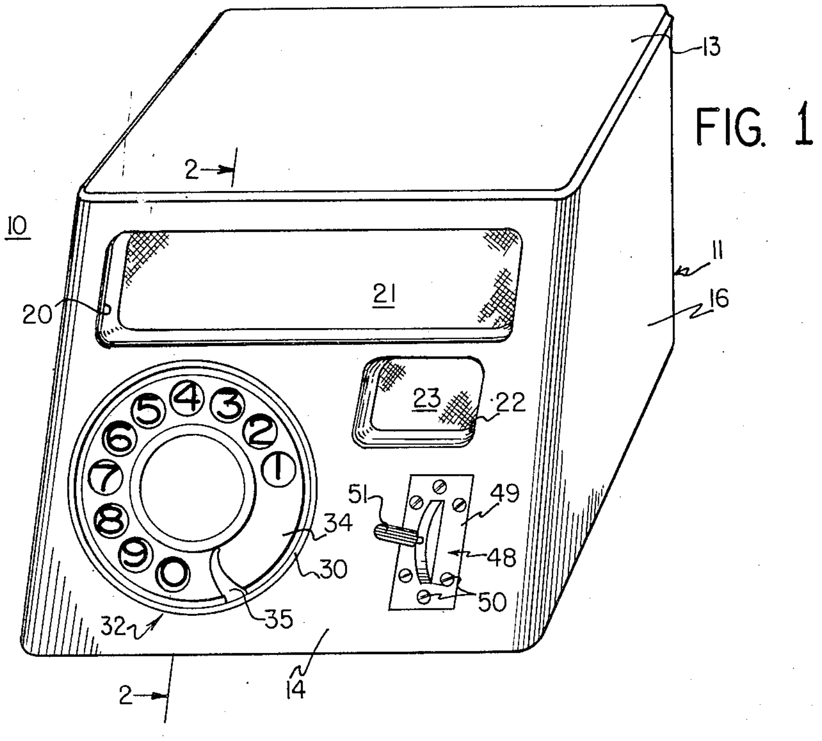
Figure 2:
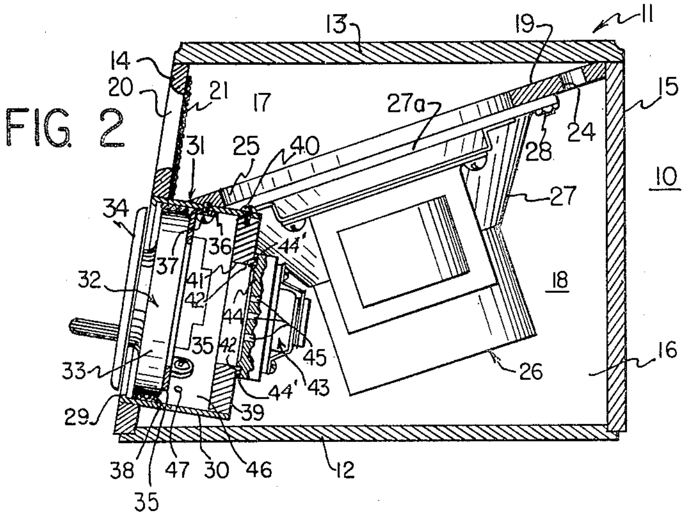

The invention, both as to its organization and method of operation, together with further objects and advantages thereof, will best be understood by reference to the following specification taken in connection with the accompanying drawing, in which Figure 1 is a perspective view of telephone station apparatus embodying the present invention; and Fig. 2 is a vertical sectional view of the telephone station apparatus taken in the direction of the arrows along the line 2—2 in Fig. 1.

Referring now more particularly to the drawing, the telephone station apparatus 10 there illustrated, and embodying the features of the present invention, comprises a housing 11 including a flat bottom wall 12, a flat top wall 13 and connecting front, rear and side walls 14, 15, and 16. The interior of the housing 11 is divided into an upper compartment 17 and a lower compartment 18 by a plate 19 extending between the side walls 16 and sloping downwardly toward the front wall 14 from the juncture of the top wall 13 and the rear wall 15, the front edge of the plate 19 joining the front wall 14 at a position disposed intermediate the upper and lower edge thereof. A first opening 20, covered by a wire or cloth screen 21, is formed in the front wall 14 above the front edge of the plate 19 and communicating with the upper compartment 17; while a second opening 22, covered by a wire or cloth screen 23, is formed in the front wall 14 below the front edge of the plate 19 and communicating with the lower compartment 18. The opening 20 formed in the front wall 14 extends transversely thereacross below the top wall 13 and substantially to the side walls 16; while the opening 22 formed in the front wall 14 is disposed below the opening 20 and toward the right-hand side wall 16 as indicated in Fig. 1. Also the plate 19 has a number of openings 24 formed therein affording free communication between the upper and lower compartments 17 and 18.

A substantially centrally disposed annular opening 25 is formed in the plate 19 and communicating with the interior of a loud speaker 26 arranged within the housing 11 and supported by the plate 19. More particularly, the loud speaker 26 is of substantially conventional construction and includes a diaphragm 27 of the frustrum-cone type secured in place to the peripheral portion of the plate 19 disposed below and adjacent to the opening 25 formed therein by an arrangement comprising an annular clamping ring 27*a* and a plurality of threaded bolts 28 receiving associated nuts. Accordingly, the upper or front surface of the diaphragm 27 communicates directly through the opening 25 formed in the plate 19 with the upper compartment 17; while the lower or rear surface of the diaphragm 27 communicates directly with the lower compartment 18; the upper compartment 17 communicating directly through the opening 20 with the exterior; the lower compartment 18 communicating directly through the opening 22 with the exterior; and the upper and lower compartments 17 and 18 freely communicating with each other through the openings 24 formed in the plate 19.

A third substantially cylindrical opening 29 is formed in the lower left-hand portion of the front wall 14 below the opening 20 and to the left of the opening 22; which third opening 29 is substantially completely closed by a cylindrical tube 30, the front end of the tube 30 being disposed substantially flush with the front wall 14 and the rear end of the tube 30 projecting within the lower compartment 18. The front edge of the plate 19 adjacent to the tube 30 has a saddle 31 formed therein embracing the upper cylindrical outer surface of the tube 30. The front end of the tube 30 carries an impulse transmitting mechanism of the dial type 32 provided with an enclosing casing 33 and the usual manually manipulatable finger wheel 34 and the associated finger stop 35. More particularly, the dial mechanism 32 is arranged within the front end of the tube 30 so that the finger wheel 34 is readily accessible from the exterior, projecting slightly forwardly with respect to the front wall 14; and the casing 33 is arranged substantially to close the front end of the tube 30. Specifically, the casing 33 is secured in place by an arrangement comprising an annular ring 35, secured thereto and provided with a plurality of rearwardly extending feet 36 anchored to the inner surface of the tube 30 by a plurality of screws 37; the space between the annular exterior surface of the casing 33 and the adjacent annular inner wall of the tube 30 adjacent to the front end thereof being substantially entirely closed and sealed by an annular ring of sponge rubber 38 or other resilient sound absorbing material.

The rear end of the tube 30 is closed by an annular disk 39 positioned therein and secured in place by a plurality of screws 40. The disk 39 has a substantially cylindrical opening 41 formed therein that is surrounded by a rearwardly projecting annular lip 42. The disk 39 supports a microphone 43 provided with a casing including a front plate 44. More specifically, the front plate 44 has an annular groove 44' formed therein that receives the annular lip 42 formed on the disk 39; and is suitably secured in place in order to close and to seal the opening 41 formed in the disk 39. Finally, the front plate 44 of the casing of the microphone 43 has a plurality of openings 45 formed therein and communicating between the interior of the casing of the microphone 43 and the interior of the tube 30 through the opening 41 formed in the disk 39. Specifically, the casing 33 of the impulse transmitting mechanism 32 sealing the front end of the tube 30, and the disk 39 in conjunction with the casing of the microphone 43 sealing the rear end of the tube 30, define a chamber 46 therebetween within the tube 30. Finally, a number of restricted passages 47 are formed in the side wall of the tube 30 intermediate the casing 33 of the impulse transmitting mechanism 32 and the disk 39 supporting the casing of the microphone 43; the restricted passages 47 communicating between the chamber 46 formed within the tube 30 and the lower compartment 18 formed within the housing 11.

Finally, a switch or key 48 is carried by the front wall 14 adjacent to the right-hand wall 16 thereof as shown in Fig. 1, and below the opening 22. The key 48 comprises a plate 49 secured in place by a plurality of screws 50 and an operating handle 51. The key 48 may be utilized to bring about certain switching functions, such, for example, as the initiation of a call or the answering of a call between the telephone station apparatus 10 and the associated telephone line, not shown.

In view of the foregoing, it will be understood that in order to initiate a call at the telephone station apparatus 10 upon the associated telephone line, not shown, the key 48 may be manipulated in order to control the associated relays, not shown, whereby the switching apparatus is connected to the associated telephone line and dial tone is returned thereover. The dial tone returned over the associated telephone line is amplified by the associated amplifier unit, not shown, whereby the loud speaker 26 reproduces the dial tone. The person at the telephone station apparatus 10 upon receiving dial tone manipulates the finger wheel 34 of the impulse transmitting device 32 in accordance with one or more digits in the usual manner; whereby the associated switching apparatus extends the connection to the called telephone station apparatus. Subsequently, after the call is answered at the called telephone station apparatus, communication between the calling telephone station apparatus 10 and the called telephone station apparatus mentioned takes place. The person at the calling telephone station apparatus 10 speaks into the opening 22 formed in the front wall 14 of the housing 11; whereby the sound waves entering the lower compartment 18 pass through the restricted passages 47 into the chamber 46 formed in the tube 30 and thence through the opening 41 formed in the disk 39 and the connecting openings 45 formed in the front plate 44 of the casing of the microphone 43 into the chamber of the microphone 43; whereby the diaphragm of the microphone 43 is actuated causing the associated amplifier unit to produce amplified undulating currents that are transmitted over the associated telephone line to the called telephone station apparatus. The undulating currents from the called telephone station apparatus traversing the associated telephone line are amplified by the associated amplifier unit and impressed upon the operating winding of the loud speaker 26; whereby the diaphragm 27 thereof is actuated to produce corresponding audible sounds. The diaphragm 27 radiates into the connected upper and lower compartments 17 and 18; whereby the sound waves pass through the openings 20 and 22 to the exterior to be heard by the person at the calling telephone station apparatus 10. In view of the foregoing it will be understood that a call may be answered at the telephone station apparatus 10 by manipulating the key 48 and that there-after conversation may proceed therefrom with respect to the calling telephone station apparatus in an identical manner. The release of the associated switching apparatus may be brought about under the control of the calling telephone station apparatus 10 again by manipulating the key 48; all in a conventional manner.

In order to prevent singing between the telephone station apparatus 10 and other similar telephone station apparatus interconnected by the associated switching apparatus and the vacuum tube amplifier units, at each telephone station apparatus 10 the acoustic coupling between the loud speaker 26 and the microphone 43 is limited by the arrangement comprising the tube 30. More particularly, the dimensions and the volume of the chamber 46 are so proportioned that the stiffness characteristic thereof is related to the impedance characteristic of the restricted passages 47 so that an acoustic wave filter is provided between the loud speaker 26 and the microphone 43. More particularly, this acoustic wave filter is of the general character of that shown in Fig. 2 of U. S. Patent No. 1,692,317, granted to George W. Stewart, on November 20, 1928; which acoustic wave filter has an operating characteristic of the character of that shown in Fig. 6 of this patent. Specifically, the acoustic wave filter transmits sound waves in the low frequency band below approximately 2000 cycles per second; and cuts off sharply and very pronounced sound waves in the high frequency band above approximately 2000 cycles per second. In fact, the cut off characteristic of the acoustic wave filter at approximately 2000 cycles per second is so pronounced that it is desirable to obtain some transition between the low frequency band and the high frequency band, in the telephone station apparatus 10; and in order to obtain this result, the sponge rubber ring 38 is provided between the casing 33 of the impulse transmitting mechanism 32 and the adjacent cylindrical inner surface of the tube 30. Specifically, the arrangement of the sponge rubber ring 38 in the outer end of the tube 30 as described above permits some acoustic coupling therethrough between the chamber 46 and the exterior of the housing 11; whereby attenuated response to sound waves in the high frequency band are attained.

Recapitulating, in the telephone station apparatus 10, sound waves in the lower frequency band may be readily transmited through the acoustic wave filter, whereas sound waves in the high frequency band are almost absolutely blocked therethrough. However, attenuated sound waves in the high frequency band may pass through the sponge rubber ring 38 from the exterior into the chamber 46 in order to operate the microphone 43.

In view of the foregoing it will be appreciated that sound waves in the high frequency band from the loud speaker 26 are not coupled appreciably to the microphone 43 due to the provision of the acoustic wave filter therebetween; whereby the acoustic coupling between the loud speaker 26 and the microphone 43 that normally produces singing between two interconnected telephone station apparatus is eliminated.

Finally, it will be appreciated that the arrangement comprising the tube 30 not only affords the acoustic wave filter above described between the loud speaker 26 and the microphone 43, but it also affords a very convenient and reliable mounting for both the impulse transmitting device 32 and the microphone 43. Specifically, this arrangement permits of preassembly into a composite unit of the impulse transmitting device 32 and the microphone 43; all prior to assembly of the other elements of the telephone station apparatus 10 with respect to the housing 11.

In view of the foregoing, it is apparent that there has been provided telephone station apparatus of the loud speaking type comprising an improved composite wave filter for limiting acoustic coupling between the loud speaker and the microphone and for supporting both the impulse transmitting mechanism and the microphone.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Telephone station apparatus comprising a housing having first and second openings formed therein, said first opening serving as a sound wave passage communicating between the interior of said housing and the exterior, a tube arranged in and substantially closing said second opening, the front end of said tube terminated adjacent to the exterior of said housing and the rear end of said tube projecting within said housing, impulse transmitting mechanism provided with a first casing and a manually manipulatable element, means for mounting said first casing on the front end of said tube and for closing substantially the front end thereof, whereby said element is accessible from the exterior, a microphone provided with a second casing, means for mounting said second casing on the rear end of said tube and for closing substantially the rear end thereof, said second casing having one or more holes formed therein and communicating between the interior thereof and the interior of said tube, said tube having one or more restricted passages formed therein intermediate the ends thereof and communicating between the interior thereof and the interior of said housing, and a loud speaker arranged within said housing and communicating with the interior thereof.

2. Telephone station apparatus comprising a housing having first and second openings formed therein, said first opening serving as a sound wave passage communicating between the interior of said housing and the exterior, a tube arranged in and substantially closing said second opening, the front end of said tube terminated adjacent to the exterior of said housing and the rear end of said tube projecting within said housing, impulse transmitting mechanism provided with a first casing and a manually manipulatable element, means including a resilient gasket for mounting said first casing within the front end of said tube and for closing substantially the front end thereof, whereby said element is accessible from the exterior, a microphone provided with a second casing, means for mounting said second casing on the rear end of said tube and for closing substantially the rear end thereof, said second casing having one or more holes formed therein and communicating between the interior thereof and the interior of said tube, said tube having one or more restricted passages formed therein intermediate the ends thereof and communicating between the interior thereof and the interior of said housing, and a loud speaker arranged within said housing and communicating with the interior thereof.

3. Telephone station apparatus comprising a housing having first and second openings formed therein, said first opening serving as a sound wave passage communicating between the interior of said housing and the exterior, a tube arranged in and substantially closing said second opening, the front end of said tube terminated adjacent to the exterior of said housing and the rear end of said tube projecting within said housing, impulse transmitting mechanism provided with a first casing and a manually manipulatable element, means for mounting said first casing within the front end of said tube and for closing substantially the front end thereof, whereby said element is accessible from the exterior, a plate mounted within the rear end of said tube and closing substantially the rear end thereof, said plate having one or more holes formed therein, a microphone provided with a second casing, means for securing said second casing to said plate in substantially sealed relation therewith, said second casing having one or more holes formed therein and communicating between the interior thereof and the interior of said tube through the hole or holes formed in said plate, said tube having one or more restricted passages formed therein intermediate the ends thereof and communicating between the interior thereof and the interior of said housing, and a loud speaker arranged within said housing and communicating with the interior thereof.

4. Telephone station apparatus comprising a housing having first and second openings formed therein, said first opening serving as a sound wave passage communicating between the interior of said housing and the exterior, a tube arranged in and substantially closing said second opening, the front end of said tube terminated adjacent to the exterior of said housing and the rear end of said tube projecting within said housing, impulse transmitting mechanism provided with a first casing and a manually manipulatable element, means for mounting said first casing on the front end of said tube for closing substantially the front end thereof, whereby said element is accessible from the exterior, a microphone provided with a second casing, means for mounting said second casing on the rear end of said tube and for closing substantially the rear end thereof, said second casing having one or more holes formed therein and communicating between the interior thereof and the interior of said tube, said tube having one or more restricted passages formed therein intermediate the ends thereof and communicating between its interior and the interior of said housing, a loud speaker arranged within said housing and communicating with the interior thereof, and means including said tube and said passage or passages formed therein for limiting the acoustic coupling between said loud speaker and said microphone.

5. Telephone station apparatus comprising a housing having first and second openings formed therein, said first opening serving as a sound wave passage communicating between the interior of said housing and the exterior, a tube arranged in and substantially closing said second opening, the front end of said tube terminated adjacent to the exterior of said housing and the rear end of said tube projecting within said housing, impulse transmitting mechanism provided with a first casing and a manually manipulatable element, means for mounting said first casing on the front end of said tube and for closing substantially the front end thereof, whereby said element is accessible from the exterior, a microphone provided with a second casing, means for mounting said second casing on the rear end of said tube and for closing substantially the rear end thereof, said second casing having one or more holes formed therein, and communicating between the interior thereof and the interior of said tube, said tube having one or more restricted passages formed therein intermediate the ends thereof and communicating between the interior thereof and the interior of said housing, and a loud speaker arranged within said housing and communicating with the interior thereof, the volume of said tube being so related to the impedance of said restricted passage or passages formed therein that an acoustic wave filter is provided between the interior of said housing and said microphone to limit the acoustic coupling between said loud speaker and said microphone.

6. Telephone station apparatus of the character of that set forth in claim 1, wherein said tube and said one or more restricted passages formed therein define a frequency responsive acoustic wave filter limiting the acoustic coupling of predetermined audio frequencies between said loud speaker and said microphone.

CHARLES F. FFOLLIOTT.

REFERENCES CITED

The following references are of record in the file of this patent:

UNITED STATES PATENTS

| Number | Name | Date |
|---|---|---|
| 1,432,623 | Riley | Oct. 17, 1922 |
| 1,941,237 | Weeber | Dec. 26, 1933 |
| 1,944,701 | Weeber | Jan. 23, 1934 |
| 2,157,140 | Molin | May 9, 1939 |
| 2,177,769 | Erickson | Oct. 31, 1939 |
| 2,191,993 | McLarn | Feb. 27, 1940 |
| 2,224,698 | Roseby | Dec. 10, 1940 |
| 2,269,565 | Tillman | Jan. 13, 1942 |
| 2,277,907 | Goodale | Mar. 31, 1942 |
| 2,369,144 | Herrick | Feb. 13, 1945 |
| 2,385,279 | Hopkins | Sept. 18, 1945 |
| 2,405,543 | Blomberg | Aug. 6, 1946 |

FOREIGN PATENTS

| Number | Country | Date |
|---|---|---|
| 489,115 | Great Britain | July 20, 1938 |

OTHER REFERENCES

Time Magazine, page 10, June 4, 1945.